United States Patent [19]

Harrington et al.

[11] 3,923,810

[45] Dec. 2, 1975

[54] PERFLUOROALKANESULFONAMIDES N-SUBSTITUTED BY HETEROCYCLIC GROUPS

[75] Inventors: Joseph Kenneth Harrington, Edina; Donald C. Kvam, North Oaks; Arthur Mendel, Vadnais Heights; Jerry E. Robertson, North Oaks, all of Minn.

[73] Assignee: Minnesota Mining and Manufacturing Company, St. Paul, Minn.

[22] Filed: Jan. 28, 1974

[21] Appl. No.: 437,502

Related U.S. Application Data

[60] Division of Ser. No. 142,381, May 11, 1971, Pat. No. 3,801,588, which is a continuation-in-part of Ser. No. 837,932, June 30, 1969, Pat. No. 3,637,729, which is a continuation-in-part of Ser. No. 588,338, Oct. 21, 1966, abandoned.

[52] U.S. Cl. ............... 260/256.5 R; 71/88; 71/89; 71/92; 71/94; 260/242; 260/250 Q; 260/270; 260/288 R; 260/294.8 C; 260/294.8 B; 260/299; 260/306.8 R; 260/307 D; 260/308 R; 260/310 R

[51] Int. Cl. ............... C07d 239/00; C07d 211/00

[58] Field of Search ............... 260/256 TR, 294.8 B

[56] References Cited

UNITED STATES PATENTS

| | | | |
|---|---|---|---|
| 3,637,729 | 1/1972 | Harrington et al. | 260/308 R |
| 3,644,354 | 2/1972 | Hardtmann et al. | 260/247.5 R |
| 3,801,588 | 4/1974 | Harrington et al. | 260/306.8 R |

*Primary Examiner*—Leonard Schenkman
*Attorney, Agent, or Firm*—Alexander, Sell, Steldt & DeLaHunt

[57] ABSTRACT

N-Substituted perfluoroalkanesulfonamides in which the sulfonamide nitrogen substituent is a heteroatom-containing group selected from pyridinyl, quinolinyl, pyrazolyl, thiazolyl, quinoxalinylphenyl, imidazo [1,2a] pridinylphenyl, imidazo [1,2a] pyrimidylphenyl and benzoxazolyl which can be unsubstituted or which can carry certain substituents.

Also included are salts of these compounds, compositions containing the compounds of the present invention and processes for their preparation and use. The compounds are active as herbicides and plant growth modifiers.

6 Claims, No Drawings

PERFLUOROALKANESULFONAMIDES N-SUBSTITUTED BY HETEROCYCLIC GROUPS

This application is a division of application Ser. No. 142,381 filed May 11, 1971, now U.S. Pat. No. 3,801,588, Ser. No. 142,381 being a continuation-in-part of application Ser. No. 837,932 filed June 30, 1969, now U.S. Pat. No. 3,637,729, Ser. No. 837,932 being in turn a continuation-in-part of application Ser. No. 588,338 filed Oct. 21, 1966 and now abandoned.

The invention relates to perfluoroalkanesulfonamides, N-substituted by heterocyclic ring-containing groups, said compounds having activity as herbicides and plant growth modifiers, and particularly as pre-emergence herbicides.

Perfluoroalkanesulfonamides have been disclosed broadly heretofore (see, for example, U.S. Pat. Nos. 2,732,398 and 3,321,445) but there has been no indication of any herbicidal activity of such compounds.

In the N-substituted perfluoroalkanesulfonamides of the present invention, the sulfonamide nitrogen substituent is a heterocyclic ring-containing group selected from pyridinyl, quinolinyl, pyrazolyl, thiazolyl, quinoxalinylphenyl, imidazo [1,2a] pyridinylphenyl, imidazo [1,2a] pyrimidylphenyl and benzoxazolyl, said groups being unsubstituted or substituted. The invention also includes salts of the compounds, processes for their preparation, compositions containing them and methods for their use as herbicides, and plant growth modifiers.

It is an object of the invention to provide compounds which modify the growth of plants, i.e., compounds which prevent, alter, destroy or otherwise affect the growth of plants.

It is a further object of the invention to provide a method for controlling unwanted plants.

It is another object of the invention to provide herbicidal compositions containing one or more perfluoroalkanesulfonamides as active ingredients therein.

Still other objects of the invention will be made apparent by the following specification.

DETAILED DESCRIPTION

According to the present invention, there is provided a class of compounds consisting of perfluoroalkanesulfonamides having the general formula:

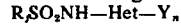

$$R_fSO_2NH\text{—}Het\text{—}Y_n \quad \quad I$$

and metal, ammonium and organic amine salts thereof wherein $R_f$ is a perfluoroalkyl group containing one to four carbon atoms, Het is selected from pyridinyl, quinolinyl, pyrazolyl, thiazolyl, quinoxalinylphenyl, imidazo[1,2a] pyridinylphenyl, imidazo[1,2a] pyrimidylphenyl and benzoxazolyl, Y is lower alkyl, halogen, cyano, lower alkoxy, nitro, amino or lower alkanolylamido and n is 0–2 when Het is thiazolyl and is otherwise 0–3. When n is zero, the Het group in the compound is not substituted by any Y groups, i.e., hydrogen appears in place of the Y groups. The compounds of the invention in which $n$ is 0 or, in which n is 1 form preferred classes of compounds of the invention.

In the metal, ammonium and organic amine salts, the sulfonamide hydrogen of the formula is replaced by a suitable cation.

The salts of the invention are prepared by treating the acid form (shown in the foregoing Formula I) with a stoichiometrically equivalent amount of an appropriate base under mild conditions. Among the metal salts of the invention are alkali metal (e.g., lithium, sodium and potassium), alkaline earth metal (e.g., barium, calcium and magnesium) and heavy metal (e.g., zinc and iron) salts as well as other metal salts such as aluminum. Appropriate bases for use in preparing the metal salts include metal oxides, hydroxides, carbonates, bicarbonates and alkoxides. Some salts are also prepared by transmetallation reactions. The organic amine salts include the salts of alkylamines and aromatic amines, primary, secondary or tertiary. These and the ammonium salts can be prepared by reacting the acid form with the appropriate organic base or ammonium hydroxide. The salts of the invention are frequently formed by reacting the precursors in aqueous solution. This solution can be evaporated to obtain the salt of the compound usually as a dry powder. In some cases, it may be more convenient to use a non-aqueous solvent such as alcohols, acetone, etc. Since many of the salts are water soluble, they are often used in the form of aqueous solutions.

Due to the acidity of the hydrogen of the sulfonamido group of Formula I, the compounds of the invention are catalysts for certain acid-catalyzed polymerizations. Many of the compounds of the invention are antimicrobial agents, according to standard test procedures. Also, some are anti-inflammatory agents when tested by standard test procedures using animals.

Preferably, $R_f$ in the compounds of the invention is trifluoromethyl. Price is an important consideration in herbicides and such compounds offer more economical utilization of fluorine together with high activity. The group Het-Yn in the compounds usually and preferably contains not more than about 16 carbon atoms. The various Y's in a compound can be the same or different. Preferably, no Y group contains more than four carbon atoms. Particularly preferred groups of compounds of the invention are those in which Het is a thiazole ring.

In order to control unwanted plants, the compounds of the invention can be used alone as herbicides, for example, as dusts or granules of the compounds, or preferably they may be applied in formulations containing the active ingredients in a horticulturally acceptable extending medium. The formulations are comprised of one or more active ingredients and one or more herbicidal diluents, adjuvants and/or carriers. Specific formulations are useful to facilitate the application of the compounds and to achieve specific biological objectives such as controlling the availability of the herbicide, improving adherence to plants, and the like, as is well known to those skilled in the art.

A presently especially preferred herbicidal compound of this invention is 2-trifluoromethanesulfonamidothiazole.

The compounds of this invention are broadly active as herbicides. However, many of the compounds of this invention also show various types of plant growth modifying activity. Plant growth modification as defined herein consists of all deviations from natural development, for example, defoliation, stimulation, stunting, retardation, desiccation, tillering, dwarfing, regulation and the like. This plant growth modifying activity is generally observed as the compounds of the invention begin to interfere with certain processes within the plant. If these processes are essential, the plant will die if treated with a sufficient dose of the compound. However, the type of growth modifying activity observed varies among types of plants. It has been found that with certain compounds of the invention, herbicidal activity can be separated from certain other plant growth modifying activities by controlling the rate of application.

Broadly speaking, the compounds of this invention are readily prepared by one or all of the following methods, each of which is illustrated by an equation.

Method A

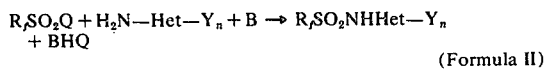
(Formula II)

where Q is a halogen or perfluoroalkanesulfonate residue, B is an organic or inorganic base which acts as an acid acceptor and $R_f$, Het, Y and n are as defined above.

A solution of the appropriate primary amine of Formula II and an equimolar quantity of a suitable acid acceptor (such as triethylamine, dimethylaniline, pyridine and the like) in an inert organic solvent is ordinarily used. However, an acid acceptor is not always necessary, and an excess of the primary amine may also serve as acid acceptor. Among the suitable solvents are 1,2-dimethoxyethane, benzene, chloroform, dichloromethane, dimethylacetamide, dimethylformamide and the like. Alternatively, an excess of the primary amine or the acid acceptor may serve as a solvent, or the reaction may be carried out in the absence of solvent. Generally, an equimolar quantity of the appropriate perfluoroalkanesulfonic anhydride or halide is added to the solution. The addition is advantageously carried out at −15° C. to 100° C., and for some reactants higher or lower temperatures may be preferable. In cases where the amine is of lower reactivity, it is advantageous to allow the reaction mixture to remain at reflux temperature for a few hours following addition.

The reaction of Method A may also be carried out in a high pressure reactor. This technique is particularly preferred when perfluoroalkanesulfonyl fluorides are used as reactants. These reactions are usually carried out at temperature ranges of 0° to 150° C., but these temperature ranges may be raised or lowered, depending upon the reactants used. Such reactions are most frequently carried out without solvent, or with dimethylformamide or excess triethylamine as solvent, but other advantageous variations are possible.

It will be appreciated that the scope of this invention encompasses starting materials of a wide range of physical and chemical properties, and the synthetic methods A, B and C discussed herein are described in general and preferred language. However, a great variation in the use of these synthetic techniques is possible, and this invention is broadly inclusive of such variations.

After completion of the reaction, the product is isolated by conventional methods. For example, the reaction mixture can be extracted with excess aqueous sodium hydroxide. The aqueous extract is then washed with organic solvents and treated with charcoal to remove impurities. Subsequent acidification of the aqueous extract with mineral acid then affords the product as an oil or solid which is distilled, sublimed, chromatographed or recrystallized as required to give pure product. When water-soluble solvents are used, the reaction mixture can be poured directly into aqueous mineral acids. The product is then isolated by conventional extraction techniques and purified as above.

Method B

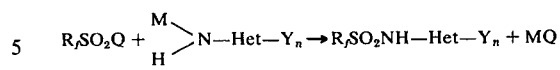

where M is an alkali metal and Q, $R_f$, Het, Y and n are as defined above.

An alkali metal salt of the appropriate amine is prepared by any of several conventional methods such as by reaction with sodium naphthalene, a metal hydride such as sodium hydride, alkoxides such as potassium t-butoxide in protic or aprotic solvents, or by reaction with an alkali metal such as sodium or potassium directly in an appropriate solvent.

The resulting salt is then treated with a perfluoroalkanesulfonyl alkylating agent such as trifluoromethanesulfonyl fluoride or chloride or trifluoromethanesulfonic anhydride, either at atmospheric pressure in open apparatus or under pressure in a pressure vessel. The reaction takes place at 0° to 150° C., depending on the reactivity of the amine and the sulfonyl halide. On completion of the reaction, the product is obtained by conventional work-up techniques as described in Method A.

Method C

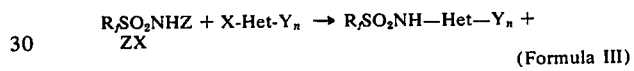
(Formula III)

$R_f$, Y, n and Het are as defined above, X is halogen and Z is an alkaline earth or alkali metal. The perfluoroalkanesulfonamide salt and an appropriate halide of Formula III are reacted, generally in a suitable solvent (such as dimethylsulfoxide, dimethylformamide, 1,2-dimethoxyethane, dimethylacetamide and the like). Heating or cooling, usually the former, may be advantageous to obtain a desirable rate of reaction.

After the completion of the reaction, the product is isolated by conventional methods. For example, when the reaction mixture is diluted with water the product may precipitate. Alternatively, the product may be extracted from the reaction mixture after dilution with water. Other recovery techniques are well known to those skilled in the art.

The reaction of Method C may also be carried in a high pressure reactor.

Method C is usually most valuable when the halide is activated by suitable electron-withdrawing groups on the ring, as is well known to the art. Suitable halides for use in Method C are well known to the art, as are salts of perfluoroalkanesulfonamides.

Suitable perfluorocarbonsulfonyl anhydrides and halides (e.g., chlorides and fluorides) for use in these procedures are known to the art (thus see U.S. Pat. No. 2,732,398). Similarly, the amines used in producing the compounds of this invention are described in the general chemical literature or may be prepared by methods known to those skilled in the art.

Methods A, B and C are generally applicable (preferably Method A) to the preparation of compounds of the invention. However, it is sometimes preferable, in order to increase yields and minimize purification problems, to utilize compounds of the invention in conventional, known procedures to prepare other compounds of the invention. For example, compounds wherein Y is nitro may be reduced by conventional methods to obtain compounds wherein Y is amino.

The following examples are given for the purpose of further illustrating the procedures of the present invention, but are not intended, in any way, to be limiting on the scope thereof. Thus while the examples relate to perfluoromethanesulfonamides, other perfluorocarbon groups can be substituted in place thereof. Also, although the examples relate for the most part to compounds in the acid form (that is having a hydrogen atom bonded to the amide nitrogen), it is understood that the corresponding salts of the invention are also easily prepared and are likewise contemplated. Such salts, which have a cation bonded to the sulfonamide nitrogen, are also useful as herbicides, and in some cases as plant growth modifiers.

EXAMPLE 1

This preparation was carried out using Method A as follows:

2-Amino-4-methylpyridine (54.1 g., 0.50 mole), triethylamine (250 ml.) and trifluoromethanesulfonyl fluoride (76.1 g., 0.50 mole) were heated at 90° C. for about one day. To this mixture was added excess sodium hydroxide (10 percent) and the mixture was steam distilled to remove triethylamine. The residue was treated with decolorizing charcoal, filtered, then acidified with concentrated hydrochloric acid. The solid product was collected by filtration, recrystallized from isopropanol then sublimed to give N-[2-(4-methylpyridyl)]trifluoromethanesulfonamide, m.p. 220.5°–222° C.

| Analysis: | %C | %H | %N |
|---|---|---|---|
| Calculated for $C_7H_7F_3N_2O_2S$: | 35.0 | 2.9 | 11.7 |
| Found: | 35.0 | 2.9 | 11.9 |

The following table lists compounds of the invention prepared according to Method A as described above.

| Example Number | Compound | M.P. (in °C.) |
|---|---|---|
| 2 | N—[2-(5-bromopyridyl]trifluoromethanesulfonamide | 238.5–240 |
| 3 | N—(2-pyridyl)trifluoromethanesulfonamide | 222–223 |
| 4 | N—(8-quinolinyl)trifluoromethanesulfonamide | 143.5–145 |
| 5 | N—[3-(5-methylpyrazolyl)]trifluoromethanesulfonamide | 206.5–212.5 |
| 6 | 4—(2-quinoxalinyl)trifluoromethanesulfonanilide | 227–231 |
| 7 | N—(2-thiazolyl)trifluoromethanesulfonamide | 202–205 |
| 8 | 2—(4-trifluoromethylsulfonamidophenyl)imidazo[1,2a]pyridine | 254–259 |
| 9 | 1,3,5-trimethyl-4-trifluoromethylsulfonamidopyrazole | 166–168.5 |
| 10 | 5—cyano-1,3-dimethyl-4-trifluoromethylsulfonamidopyrazole | 149–151 |
| 11 | N—[3-(2,6-dimethoxypyridyl)]trifluoromethanesulfonamide | 89.5–91 |
| 12 | N—[5-(2-methoxypyridyl)]trifluoromethanesulfonamide | 144.5–146.5 |
| 13 | N—[2-(6-methylpyridyl)]trifluoromethanesulfonamide | 167–168 |
| 14 | N—(4-pyridyl)trifluoromethanesulfonamide | 310–313 |
| 15 | N—(3-pyridyl)trifluoromethanesulfonamide | 240–242 |
| 16 | N—[4-(3-bromopyridyl)]trifluoromethanesulfonamide | 173.5–175.5 |
| 17 | N—[2-(5-nitropyridyl)]trifluoromethanesulfonamide | 235–236.5 |
| 18 | N—[3-(2-chloropyridyl)]trifluoromethanesulfonamide | 118.5–120.5 |
| 19 | N—[5-(2-n-butoxypyridyl)]trifluoromethanesulfonamide | 84.5–86.5 |
| 20 | N—[2-(4,6-dimethylpyridyl)]trifluoromethanesulfonamide | 127–128 |
| 21 | 2—(4-trifluoromethylsulfonamidophenyl) imidazo[1,2a]pyrimidine | 250 |

EXAMPLE 22

This preparation was carried out using Method C as follows:

A solution of trifluoromethanesulfonamide (14.9 g., 0.10 mole) in dimethylformamide was treated with 1 equivalent of sodium hydride and the mixture added at room temperature to 15.3 g. of 2-chlorobenzoxazole in dimethylformamide. The reaction mixture was heated with stirring for 2 hours at 80° C. and poured into 600 mls. of aqueous sodium hydroxide. The aqueous layer was washed with ether and acidified with hydrochloric acid. A white solid precipitated. Recrystallization from aqueous ethanol afforded an analytical sample of N-(2-benzoxazolyl)trifluoromethanesulfonamide, m.p. 197.5°–198° C.

| Analysis: | %C | %H |
|---|---|---|
| Calculated for $C_8H_5F_3N_2O_3S$: | 36.1 | 1.9 |
| Found: | 36.2 | 1.9 |

EXAMPLE 23

N-[2-(5-nitropyridyl)]trifluoromethanesulfonamide (20 g., 0.074 mole) in ethanol (250 ml.) was reduced over palladium on charcoal with hydrogen gas. The catalyst was removed by filtration and the ethanol evaporated in vacuo to give N-[2-(5-aminopyridyl)]trifluoromethanesulfonamide.

N-[2-(5-aminopyridyl)]trifluoromethanesulfonamide (12 g., 0.05 mole), acetyl chloride (3.92 g., 0.050 mole) and triethylamine (5.1 g., 0.05 mole) in benzene (80 ml.) were stirred overnight. The volatile portions were removed in vacuo and the residue recrystallized from a water-ethanol mixture to give N-[2-(5-acetamidopyridyl)]trifluoromethanesulfonamide, m.p. 266°–267.5° C.

| Analysis: | %C | %H | %N |
|---|---|---|---|
| Calculated for $C_8H_8F_3N_3O_3S$: | 33.9 | 2.9 | 14.8 |
| Found: | 34.0 | 2.8 | 15.0 |

EXAMPLE 24

N-(2-thiazolyl)trifluoromethanesulfonamide (25.6 g., 0.10 mole) was mixed with 95 percent ethanol (300 ml.) and water (50 ml.) and bromine (32.0 g., 0.2 mole) was added dropwise with stirring. The reaction was stirred at room temperature for 2 hours, then warmed to 50° C. for thirty minutes. The reaction mixture was added to ice water (1.5 l.) and the product collected by filtration. Recrystallization from benzene gave N-[2-(5-bromothiazolyl)]trifluoromethanesulfonamide, m.p. 195.3°–198° C.

| Analysis: | %C | %H | %N |
|---|---|---|---|
| Calculated for $C_4H_2Br_2F_3N_2O_2S_2$: | 15.4 | 0.6 | 9.0 |
| Found: | 15.6 | 0.7 | 9.1 |

EXAMPLE 25

N-(2-thiazolyl)trifluoromethanesulfonamide (25 g., 0.1 mole) in carbon disulfide (250 ml.) was heated to reflux temperature and maintained there while adding sulfuryl chloride (50 g., 0.37 mole) in carbon disulfide (100 ml.) dropwise during three hours with vigorous stirring. Reflux and stirring were continued 12 hours. More sulfuryl chloride (50 g.) was added and refluxing was carried out intermittently for several days for a total of 24 hours. A solid product was obtained by cooling and collected by filtration, then recrystallized from benzene-ethanol to give N-[2-(5-chlorothiazolyl)]trifluoromethanesulfonamide, m.p. 167°–168° C.

| Analysis: | %C | %H | %N |
|---|---|---|---|
| Calculated for $C_4H_2ClF_3N_2O_2S_2$: | 18.0 | 0.8 | 10.5 |
| Found: | 18.2 | 0.7 | 10.3 |

EXAMPLE 26

Representative salts of the invention which have been prepared are:

Sodium N-(2-pyridyl)trifluoromethanesulfonamide (partially purified sample decomposes 150°–165° C.)

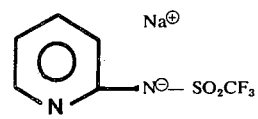

Zinc N-(8-quinolinyl)trifluoromethanesulfonamide; m.p. greater than 300° C.

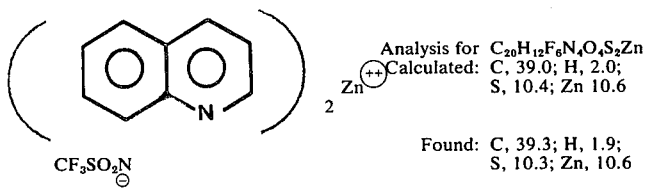

Analysis for $C_{20}H_{12}F_6N_4O_4S_2Zn$
Calculated: C, 39.0; H, 2.0; S, 10.4; Zn 10.6

Found: C, 39.3; H, 1.9; S, 10.3; Zn, 10.6

Copper N-(8-quinolinyl)trifluoromethanesulfonamide; m.p. greater than 300° C.

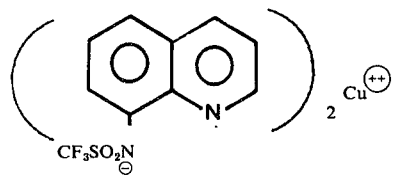

What is claimed is:
1. A compound of the formula:
   $R_fSO_2NHHet$
   and metal, ammonium and organic amine salts thereof wherein $R_f$ is a perfluoroalkyl group containing one to four carbon atoms, and Het is imidazo[1,2a]pyridinylphenyl or imidazo[1,2a]pyrimidylphenyl.
2. A compound according to claim 1 in which $R_f$ is $CF_3$.
3. The compound 2-(4-trifluoromethylsulfonamidophenyl)imidazo[1,2a]pyridine according to claim 2.
4. The compound 2-(4-trifluoromethylsulfonamidophenyl) imidazo[1,2a]pyrimidine according to claim 2.
5. A compound of the formula:
   $R_fSO_2NHHet$
   and metal, ammonium and organic amine salts thereof wherein $R_f$ is a perfluoroalkyl group containing one to four carbon atoms and Het is imidazo[1,2a]pyridinylphenyl.
6. A compound of the formula:
   $R_fSO_2NHHet$
   and metal, ammonium and organic amine salts thereof wherein $R_f$ is a perfluoroalkyl group containing one to four carbon atoms and Het is imidazo[1,2a]pyrimidylphenyl.

* * * * *